(12) United States Patent
Naganawa et al.

(10) Patent No.: US 9,514,895 B2
(45) Date of Patent: Dec. 6, 2016

(54) ELECTRIC STORAGE DEVICE HAVING CURRENT COLLECTOR AND VEHICLE HAVING THE ELECTRIC STORAGE DEVICE

(75) Inventors: Nobuyuki Naganawa, Kyoto (JP); Masamitsu Tononishi, Kyoto (JP); Shinsuke Yoshitake, Kyoto (JP); Yasunori Okuno, Kyoto (JP); Masakazu Tsutsumi, Kyoto (JP); Hajime Kawamoto, Osaka (JP); Tomonori Kishimoto, Kyoto (JP); Jun Nakamura, Kyoto (JP); Toshiyuki Nukuda, Kyoto (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 632 days.

(21) Appl. No.: 13/989,042

(22) PCT Filed: Dec. 8, 2011

(86) PCT No.: PCT/JP2011/078456
§ 371 (c)(1),
(2), (4) Date: May 22, 2013

(87) PCT Pub. No.: WO2012/086427
PCT Pub. Date: Jun. 28, 2012

(65) Prior Publication Data
US 2013/0252080 A1 Sep. 26, 2013

(30) Foreign Application Priority Data

Dec. 20, 2010 (JP) .................................. 2010-282838
Dec. 20, 2010 (JP) .................................. 2010-282840

(Continued)

(51) Int. Cl.
*H01M 2/22* (2006.01)
*H01G 11/70* (2013.01)
(Continued)

(52) U.S. Cl.
CPC .............. *H01G 11/70* (2013.01); *H01G 11/82* (2013.01); *H01M 2/22* (2013.01); *H01M 2/263* (2013.01);
(Continued)

(58) Field of Classification Search
CPC ....................................................... H01M 2/22
See application file for complete search history.

(56) References Cited

U.S. PATENT DOCUMENTS

2001/0041288 A1 11/2001 Onishi et al.
2003/0077508 A1* 4/2003 Asahina et al. .............. 429/160
(Continued)

FOREIGN PATENT DOCUMENTS

CN 1713438 A 12/2005
CN 101872870 A 10/2010
(Continued)

OTHER PUBLICATIONS

JP 2010231945 MT.*
International Search Report in PCT/JP2011/078456 dated Feb. 28, 2012(English Translation Thereof).

*Primary Examiner* — Patrick Ryan
*Assistant Examiner* — Alex Usyatinsky
(74) *Attorney, Agent, or Firm* — McGinn IP Law Group, PLLC

(57) ABSTRACT

Provided are an electric storage device in which a current collector is not easily broken even when vibration is applied, and a vehicle having this electric storage device. This electric storage device includes a case having a first inner surface and a second inner surface adjacent to the first inner (Continued)

surface, an electrode assembly housed in the case and including a positive electrode plate and a negative electrode plate insulated from each other, an electrode terminal disposed outside the case, and a current collector housed in the case and electrically connecting the electrode assembly and the electrode terminal to each other. A distal end edge of a distal end portion of the current collector is supported on the first inner surface of the case.

18 Claims, 12 Drawing Sheets

(30) Foreign Application Priority Data

Dec. 20, 2010 (JP) .................................. 2010-282842
Dec. 20, 2010 (JP) .................................. 2010-282845

(51) Int. Cl.
*H01M 2/26* (2006.01)
*H01M 10/04* (2006.01)
*H01M 4/70* (2006.01)
*H01G 11/82* (2013.01)

(52) U.S. Cl.
CPC ........... *H01M 4/70* (2013.01); *H01M 10/0413* (2013.01); *H01M 10/0431* (2013.01); *H01M 2220/20* (2013.01); *Y02E 60/13* (2013.01); *Y02T 10/7022* (2013.01)

(56) References Cited

U.S. PATENT DOCUMENTS

| | | | |
|---|---|---|---|
| 2003/0186113 A1* | 10/2003 | Hashimoto | H01M 2/06 429/94 |
| 2005/0287431 A1 | 12/2005 | Cho | |
| 2006/0093910 A1 | 5/2006 | Yoon et al. | |
| 2007/0092792 A1* | 4/2007 | Kasahara et al. | 429/161 |
| 2007/0117009 A1 | 5/2007 | Yamauchi et al. | |
| 2009/0166116 A1 | 7/2009 | Kiya et al. | |
| 2010/0266894 A1* | 10/2010 | Byun et al. | 429/178 |
| 2010/0273040 A1 | 10/2010 | Kubota et al. | |
| 2010/0307848 A1 | 12/2010 | Hashimoto et al. | |
| 2010/0316897 A1 | 12/2010 | Kozuki et al. | |

FOREIGN PATENT DOCUMENTS

| | | |
|---|---|---|
| EP | 2244328 A2 | 10/2010 |
| JP | H 8-315854 A | 11/1996 |
| JP | 10-189055 A | 7/1998 |
| JP | 2000-150306 A | 5/2000 |
| JP | 2001-114153 A | 4/2001 |
| JP | 2001-119801 A | 4/2001 |
| JP | 2001-307760 A | 11/2001 |
| JP | 2002-157984 A | 5/2002 |
| JP | 2002-231213 A | 8/2002 |
| JP | 2002-231214 A | 8/2002 |
| JP | 2002-319388 A | 10/2002 |
| JP | 2003-093402 A | 4/2003 |
| JP | 2003-123731 A | 4/2003 |
| JP | 2003-249423 A | 9/2003 |
| JP | 2003-297413 A | 10/2003 |
| JP | 2003-346770 A | 12/2003 |
| JP | 2005-032477 A | 2/2005 |
| JP | 2006-012830 A | 1/2006 |
| JP | 2006-128132 A | 5/2006 |
| JP | 2006-236790 A | 9/2006 |
| JP | 2007-149353 A | 6/2007 |
| JP | 2007-200850 A | 8/2007 |
| JP | 2007-253933 A | 10/2007 |
| JP | 2007-299536 A | 11/2007 |
| JP | 2008-251260 A | 10/2008 |
| JP | 2009-037818 A | 2/2009 |
| JP | 2009-110751 A | 5/2009 |
| JP | 2010-021067 A | 1/2010 |
| JP | 2010-231945 A | 10/2010 |
| JP | 2010-257945 A | 11/2010 |
| JP | 2010-272324 A | 12/2010 |
| JP | 2010-284984 A | 12/2010 |
| KR | 2005-0121906 A | 12/2005 |
| KR | 2007-0055336 A | 5/2007 |
| KR | 2010-0115983 A | 10/2010 |
| WO | WO 2009-066661 A1 | 5/2009 |

* cited by examiner

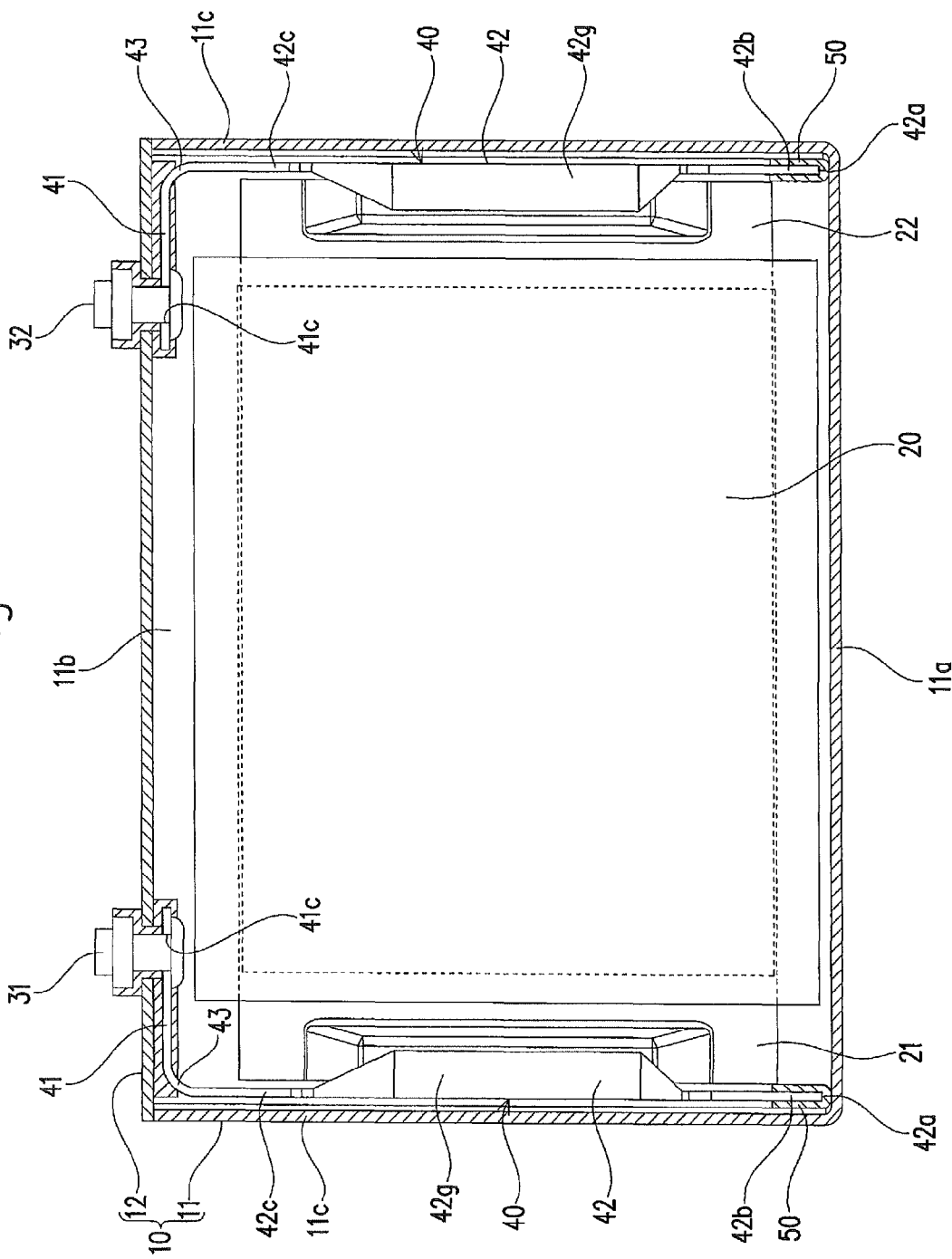

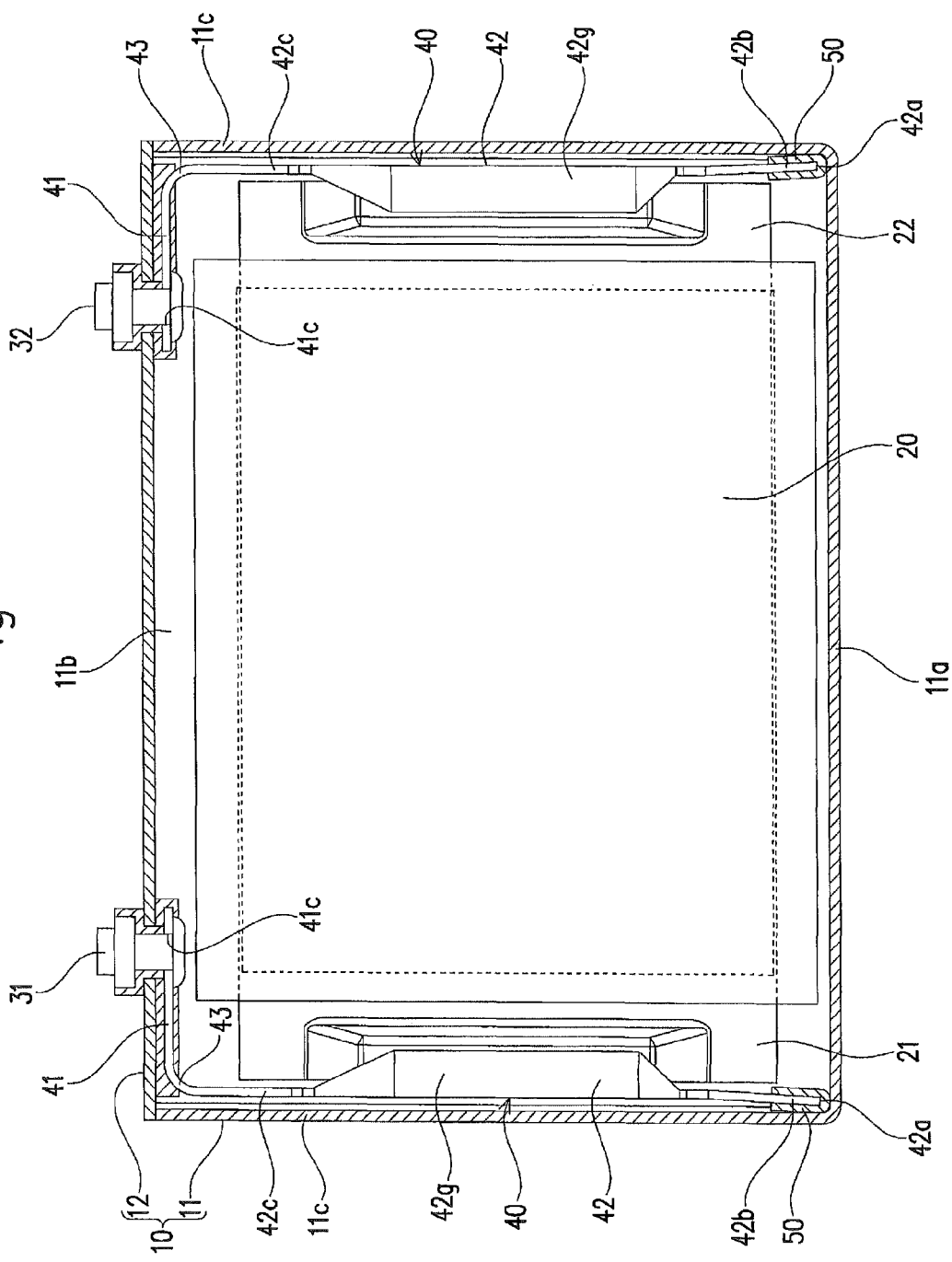

ELECTRIC STORAGE DEVICE HAVING CURRENT COLLECTOR AND VEHICLE HAVING THE ELECTRIC STORAGE DEVICE

TECHNICAL FIELD

The present invention relates to an electric storage device having a current collector. The present invention also relates to a vehicle having the electric storage device.

BACKGROUND ART

In recent years, rechargeable electric storage devices such as battery cells (lithium-ion cells, nickel-hydrogen cells, or the like) and capacitors (electric double layer capacitors or the like) have been adopted as motive power sources for vehicles (motor vehicles, motorcycles or the like) or various devices (portable terminals, notebook computers or the like). As motive power sources for electric vehicles or the like in particular, various lithium secondary cells having high energy densities have been provided. Such a lithium secondary cell includes a cell case made of a metal, a power generating element housed in the cell case, electrode terminals projecting from the inside to the outside of the cell case, and current collectors that connect the power generating element and the electrode terminals. Patent Document 1 describes the invention of a prismatic secondary cell having a power generating element and current collectors connected to each other without increasing the internal resistance of the cell.

In this prismatic secondary cell, as shown in FIG. 11, a power generating element ("wound electrode assembly" in Patent Document 1) 120 is housed in a cell case ("cell can" in Patent Document 1) 110, with gaps provided between the power generating element 120 and inner surfaces of the cell case 110; positive and negative electrode terminals 131 and 132 project from the inside to the outside of the cell case 110; and the power generating element 120 is connected to the electrode terminals 131 and 132 by current collectors ("current collecting members" in Patent Document 1) 140.

The power generating element 120 has a separator in band form interposed between positive and negative electrode plates each in band form (not individually illustrated), in which the separator and the positive and negative electrode plates are spirally wound and compressed into a flat shape. The power generating element 120 has central holes 121 such as shown in FIG. 12 (only one of them is illustrated in FIG. 12) at a winding center between its opposite end portions. The power generating element 120 also has core bundle portions 122 at its opposite sides. The core bundle portions 122 are projecting end portions of positive and negative cores through the respective sides. The power generating element 120 is housed in the cell case 110, with the central holes 121 facing end surfaces of the cell case 110, and with the core bundle portions 122 positioned at the opposite ends of the cell case 110.

Each current collector 140 has a terminal connection portion 141 welded to the electrode terminal 131 or 132, a core connection portion 142 inserted in the central hole 121 of the power generating element 120, and a link portion 143 that links the terminal connection portion 141 and the core connection portion 142. The current collector 140 is formed by pressing one rectangular metal plate.

The link portion 143 has a width slightly smaller than the width in the compression direction of the power generating element 120. The link portion 143 is bent orthogonally to the core connection portion 142 (to be L-shaped in the front view). The core connection portion 142 is folded in half along its longitudinal center line. The ridge of the fold is projecting in the direction of bending of the terminal connection portion 141.

The core connection portion 142 is inserted in the central hole 121 of the power generating element 120, and the core bundle portion 122 of the power generating element 120 is pressed, thereby bringing the core connection portion 142 and the power generating element 120 into pressure contact with each other. In this state, ultrasonic welding is performed from one outer peripheral side of the core bundle portion 122 to connect the core connection portion 142 and the inner peripheral surface of the core bundle portion 122 without increasing the internal resistance.

The cell case 110 is a combination of a case body 111 in the form of a bottomed rectangular cylinder having an opening, and a cover plate 112 with which the opening of the case body 111 is closed. End edges of the opening of the case body 111 and outer peripheral edges of the cover plate 112 are welded to each other. Holes (not numbered) through which the electrode terminals 131 and 132 are passed are provided in the cover plate 112. The electrode terminals 131 and 132 project through the holes of the cover plate 112 and are fixed on the cover plate 112 by rivets. Electric power generated in the power generating element 120 is taken out through the electrode terminals 131 and 132 projecting from the cover plate 112.

In the conventional cell, gaps are provided between the power generating element 120 and the inner surfaces of the case body 111 of the cell case 110. Therefore the power generating element 120 is in a state of being suspended from the cover plate 112 by the current collectors 140. Also, the terminal connection portions 141 of the current collectors 140 are fixed to the cover plate 112 of the cell case 110.

Therefore, when vibration occurs in the cell mounted, for example, on a motor vehicle during traveling, the power generating element 120 vibrates with an amplitude and a frequency different from those of the vibration of the case body 111. Stress is then caused in the portions where the current collectors 140 is connected to the power generating element 120 and the portions where the current collectors 140 is bent (link portions 143), resulting in breakage of these portions and inoperability of the cell in some cases.

A repetitive test based on the vibration test profile in accordance with the UN Transport Test was performed on a current collector similar in form to the current collector 140 described in Patent Document 1 by successively increasing the parameter that defines the maximum acceleration to 8, 10, 12, 15, 18, 20, and 22 G. Breakage was caused in some samples at 16 G and 8 G.

In the conventional cell, not only welding of the current collectors 140 to the power generating element 120 and to the electrode terminals 131 and 132 but also welding between the case body 111 and the cover plate 112 of the cell case 110 is performed. Therefore, each current collector 140 cannot be replaced by being taken out after the current collector 140 is broken.

There is the same kind of problem with current collectors in capacitors (electric double layer capacitors or the like).

CITATION LIST

Patent Document

Patent Document 1: Japanese Patent Laid-Open No. 2006-236790

SUMMARY OF INVENTION

Technical Problem

It is, therefore, an object of the present invention to provide an electric storage device designed so that current collectors are not easily broken when vibration is applied, and a vehicle having the electric storage device.

Solution to Problem

An electric storage device according to the present invention includes:

a case having a first inner surface and a second inner surface adjacent to the first inner surface;

an electrode assembly housed in the case and including a positive electrode plate and a negative electrode plate insulated from each other;

an electrode terminal disposed outside the case; and a current collector housed in the case and electrically connecting the electrode assembly and the electrode terminal to each other, and a distal end edge of a distal end portion of the current collector is supported on the first inner surface of the case.

In one embodiment of the present invention, the electric storage device may have a configuration in which the distal end portion of the current collector is bent so as to be brought into contact with the second inner surface of the case.

In another embodiment of the present invention, the electric storage device may have a configuration in which the distal end portion of the current collector is bent so as to extend along the first inner surface of the case.

In yet another embodiment of the present invention, the electric storage device may have a configuration in which the distal end edge of the distal end portion of the current collector is supported on the first inner surface of the case by contact with the first inner surface of the case.

In yet another embodiment of the present invention, the electric storage device may have a configuration in which:

a gap is provided between the distal end edge of the distal end portion of the current collector and the first inner surface of the case;

the current collector has a spacer in the gap; and the distal end edge of the distal end portion of the current collector is supported on the first inner surface of the case via the spacer.

In such a case, it is preferable that the spacer have an insulating property.

In another embodiment of the present invention, the electric storage device may have a configuration in which:

the current collector has an electrode attachment portion disposed between an end portion of the electrode assembly and the second inner surface of the case, the electrode attachment portion being electrically connected to the end portion of the electrode assembly; and the distal end edge of the distal end portion of the electrode attachment portion is supported on the first inner surface of the case.

According to yet another embodiment of the present invention, the electric storage device may have a configuration in which:

the current collector has an internal connection portion connected to the electrode terminal, an electrode attachment portion disposed between an end portion of the electrode assembly and the second inner surface of the case, the electrode attachment portion being electrically connected to the end portion of the electrode assembly, and an intermediate portion interposed between the internal connection portion and the electrode attachment portion; and the intermediate portion has spring properties.

In yet another embodiment of the present invention, the electric storage device may have a configuration in which:

an opening is provided in the electrode attachment portion along a longitudinal direction of the electrode attachment portion; and the electrode attachment portion has along an edge of the opening a projection connected to the end portion of the electrode assembly.

In such a case, it is preferable that the strength of the electrode attachment portion on the proximal end portion side be higher than the strength of the electrode attachment portion on the distal end portion side.

In yet another aspect of the present invention, the electric storage device may have a configuration in which:

the electrode attachment portion has a cut at an end of the opening on the proximal end portion side of the electrode attachment portion, and another cut at an end of the opening on the distal end portion side of the electrode attachment portion; and the opening angle of the cut on the proximal end portion side of the electrode attachment portion is set smaller than the opening angle of the cut on the distal end portion side of the electrode attachment portion.

In this case, the electric storage device may have a configuration in which:

each of the cuts has a stop hole in its sharp end portion; and the stop hole in the cut on the proximal end portion side of the electrode attachment portion is made smaller than the stop hole in the cut on the distal end portion side of the electrode attachment portion.

In yet another aspect of the present invention, the electric storage device may have a configuration in which the width of the electrode attachment portion on the proximal end portion side is made larger than the width of the electrode attachment portion on the distal end portion side.

A vehicle according to the present invention has one of the above-described electric storage devices.

BRIEF DESCRIPTION OF DRAWINGS

FIG. 1 is a partially sectional front view of a cell having a current collector according to a first embodiment.

FIG. 2(a) is a front view, FIG. 2(b) is a side view, and FIG. 2(c) is a perspective view.

FIG. 4 is a partially sectional front view of a cell having a current collector according to a second embodiment.

FIG. 5(a) is a front view, FIG. 5(b) is a side view, and FIG. 5(c) is a perspective view.

FIG. 8(a) is a front view, FIG. 8(b) is a side view, and FIG. 8(c) is a perspective view.

FIGS. 10(a) and 10(b) are front view of different examples of the current collector.

DESCRIPTION OF EMBODIMENTS

Figure 2C:
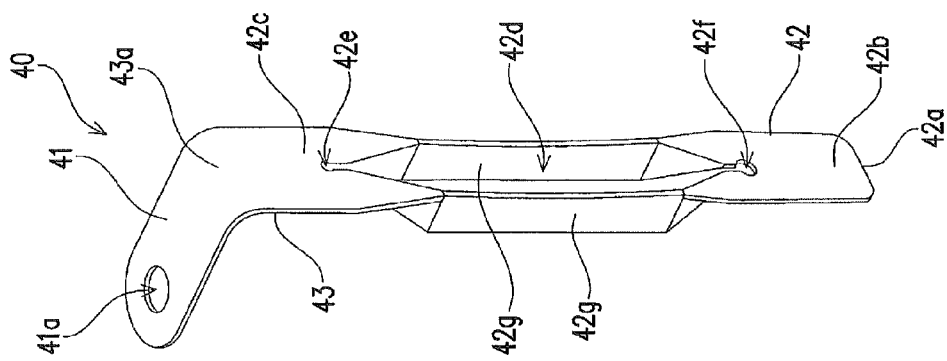
FIGS. 2(a), 2(b), and 2(c) show the current collector.

A cell which is an embodiment of an electric storage device according to the present invention will be described below. The cell according to the present embodiment will first be outlined.

The cell according to the present embodiment includes:

a cell case having a first inner surface and a second inner surface adjacent to the first inner surface;

a power generating element housed in the cell case and including a positive electrode plate and a negative electrode plate insulated from each other;

an electrode terminal disposed outside the cell case; and a current collector housed in the cell case and electrically connecting the power generating element and the electrode terminal to each other, and a distal end edge of a distal end portion of the current collector is supported on the first inner surface of the cell case.

In this cell, the distal end edge of the distal end portion (an end portion of the current collector opposite to a fixed end portion of the current collector fixed in the cell case in a state of being electrically insulated from the cell case) is supported on the first inner surface of the cell case (in an electrically insulated state), so that the power generating element is not in a state of being suspended by the current collector; the power generating element, the current collector, and the cell case are in an integrally combined state. Therefore, the power generating element, the current collector, and the cell case vibrate integrally with each other, even if vibration is applied to the cell. That is, the power generating element does not vibrate with an amplitude and a frequency different from those of the vibration of the cell case. Therefore, no stress is caused in portions of the current collector including the portion connected to the power generating element, thus enabling prevention of breakage of the current collector.

In one aspect of the cell according to the present embodiment, the distal end portion of the current collector may be bent so as to be brought into contact with the second inner surface of the cell case.

In this cell case, by bending the distal end portion of the current collector so as that the distal end portion is brought into contact with the second inner surface of the cell case, the distal end portion of the current collector functions like a stay. Therefore, the power generating element can be supported in a stable state.

In another aspect of the cell according to the present embodiment, the distal end portion of the current collector may be bent so as to extend along the first inner surface of the cell case.

In this cell, by bending the distal end portion of the current collector so as that the distal end portion extends along the first inner surface of the cell case, the distal end portion of the current collector contacts the first inner surface of the cell case by its surface. Therefore, the power generating element can be supported in a stable state.

In yet another aspect of the cell according to the present embodiment, the distal end edge of the distal end portion of the current collector may be supported on the first inner surface of the cell case by contact with the first inner surface of the cell case.

In this cell, by contact with the first inner surface of the cell case, the distal end edge of the distal end portion of the current collector is supported on the first inner surface of the cell case. As a result, the power generating element, the current collector, and the cell case can be maintained in an integrally combined state. The state in which the distal end edge of the distal end portion of the current collector is in contact with the first inner surface of the cell case includes a state in which an insulating material is interposed therebetween.

In yet another aspect of the present invention, the cell may have a configuration in which:

a gap is provided between the distal end edge of the distal end portion of the current collector and the first inner surface of the cell case;

the current collector has a spacer in the gap; and the distal end edge of the distal end portion of the current collector is supported on the first inner surface of the cell case via the spacer.

In this cell, the distal end edge of the distal end portion of the current collector is supported on the first inner surface of the cell case via the spacer. Therefore, the power generating element, the current collector, and the cell case can be maintained in an integrally combined state.

In this case, it is preferable that the spacer have an insulating property.

In this cell, interposition of the spacer having an insulating property between the distal end edge of the distal end portion of the current collector and the first inner surface of the cell case ensures insulation between the current collector and the cell case.

In the case where the distal end portion of the current collector is bent so as to extend along the first inner surface of the cell case, the distal end edge of the distal end portion of the current collector is prevented from being stabbed into the spacer having an insulating property by interposing the spacer between itself and the first inner surface of the cell case. Thus, breakage of the spacer having an insulating property can be prevented. It is also possible to prevent the bent portion from stabbing into the spacer having an insulating property by bending the distal end portion of the current collector into a circular-arc shape. Thus, breakage of the spacer having an insulating property can also be prevented in the same manner.

In another aspect of the present invention, the cell may have a configuration in which:

the current collector has an electrode attachment portion disposed between an end portion of the power generating element and the second inner surface of the cell case, the electrode attachment portion being electrically connected to the end portion of the power generating element, and the distal end edge of the distal end portion of the electrode attachment portion is supported on the first inner surface of the cell case.

In this cell, by supporting the distal end edge of the distal end portion of the electrode attachment portion on the first inner surface of the cell case, the power generating element, the current collector, and the cell case are maintained in an integrally combined state, while supporting the power generating element in a state of being suspended by the current collector is avoided. Therefore, even if vibration is applied to the cell, the power generating element, the current collector, and the cell case vibrate integrally. That is, the power generating element does not vibrate with an amplitude and a frequency different from those of the vibration of the cell case. Therefore, no stress is caused in portions of the electrode attachment portion including the portion connected to the power generating element, thus enabling prevention of breakage of the current collector.

According to yet another aspect of the present invention, the cell may have a configuration in which the current collector has:

an internal connection portion connected to the electrode terminal;

an electrode attachment portion disposed between an end portion of the power generating element and the second inner surface of the cell case, the electrode attachment portion being electrically connected to the end portion of the power generating element; and an intermediate portion interposed between the internal connection portion and the electrode attachment portion, and the intermediate portion has spring properties.

In this cell, even if the power generating element vibrates with an amplitude and a frequency different from those of the cell case when vibration is applied to the cell, the vibration of the power generating element is absorbed in the intermediate portion since the intermediate portion has spring properties. Thus, the occurrence of stress in portions of the electrode attachment portion including the portion connected to the power generating element can be prevented.

In yet another aspect of the present invention, the cell may have a configuration in which:

an opening is provided in the electrode attachment portion along a longitudinal direction of the electrode attachment portion; and the electrode attachment portion may have along an edge of the opening a projection connected to the end portion of the power generating element.

In this cell, the projection provided along the edge of the opening is connected to the power generating element. The form of the projection can facilitate the connection between the positive electrode plate or the negative electrode plate of the power generating element and the electrode attachment portion.

In this case, it is preferable that the strength of the electrode attachment portion on the proximal end portion side be higher than the strength of the electrode attachment portion on the distal end portion side.

In this cell, by setting the strength of the electrode attachment portion on the proximal end portion side higher than the strength of the electrode attachment portion on the distal end portion side, breakage of the electrode attachment portion on the proximal end portion side can be reduced.

In yet another aspect of the present invention, the cell may have a configuration in which:

the electrode attachment portion has a cut at an end of the opening on the proximal end portion side of the electrode attachment portion, and another cut at an end of the opening on the distal end portion side of the electrode attachment portion; and the opening angle of the cut on the proximal end portion side of the electrode attachment portion is set smaller than the opening angle of the cut on the distal end portion side of the electrode attachment portion.

In this cell, the strength of the electrode attachment portion on the proximal end portion side can be increased relative to the strength of the electrode attachment portion on the distal end portion side by providing a cut at an end of the opening on the proximal end portion side of the electrode attachment portion and another cut at an end of the opening on the distal end portion side of the electrode attachment portion and by setting the opening angle of the cut on the proximal end portion side of the electrode attachment portion smaller than the opening angle of the cut on the distal end portion side of the electrode attachment portion.

In this case, it is possible to employ a configuration in which:

each of the cuts has a stop hole in its sharp end portion; and the stop hole in the cut on the proximal end portion side of the electrode attachment portion is made smaller than the stop hole in the cut on the distal end portion side of the electrode attachment portion.

In this cell, the strength of a portion around the stop hole in the cut on the proximal end portion side of the electrode attachment portion can be increased relative to the strength of a portion around the stop hole in the cut on the distal end portion side of the electrode attachment portion by providing a stop hole in a sharp end portion of each cut and by making the stop hole in the cut on the proximal end portion side of the electrode attachment portion smaller than the stop hole in the cut on the distal end portion side of the electrode attachment portion.

In yet another aspect of the cell according to the present embodiment, the width of the electrode attachment portion on the proximal end portion side may be made larger than the width of the electrode attachment portion on the distal end portion side.

In this cell, the strength of the electrode attachment portion on the proximal end portion side can be increased relative to the strength of the electrode attachment portion on the distal end portion side by increasing the width of the electrode attachment portion on the proximal end portion side relative to the width of the electrode attachment portion on the distal end portion side.

A vehicle according to the present embodiment has one of the above-described cells.

In this vehicle, even when vibration is applied to the cell, the current collector in the cell is not easily broken. Therefore, malfunctions due to the cell can be reduced.

As described above, the cell in which the current collector is not easily broken even when the cell vibrates is provided, thus enabling increasing the life of the cell.

<First Embodiment>

A first embodiment of the cell according to the present embodiment will be described in detail with reference to FIGS. 1 to 3.

The cell according to the first embodiment includes a cell case 10 made of a metal, a power generating element 20 housed in the cell case 10, a positive electrode terminal 31 and a negative electrode terminal 32 projecting from the inside to the outside of the cell case 10, and current collectors 40 that connect the power generating element 20 and the electrode terminals 31 and 32, as does the conventional cell.

The cell case 10 is a combination of a case body 11 in the form of a rectangular cylinder having an opening and closed at its bottom, and a cover plate 12 with which the opening of the case body 11 is closed. After assembly of the two parts 11 and 12, end edges of the opening of the case body 11 and outer peripheral edges of the cover plate 12 are welded to integrally combine the two parts 11 and 12.

The case body 11 has a pair of opposed side plate portions 11b and a pair of opposed end plate portions 11c standing upright on peripheral edges of a rectangular bottom portion 11*a*. The pair of end plate portions 11*c* of the case body 11 are formed so as to be smaller in width (than the pair of side plate portions 11*b*). In this way, the case body 11 is formed into the shape of a thin rectangular cylinder having a small depth and closed at its bottom. The thin case body 11 thus formed can have improved heat radiation property in comparison with a non-thin-type case body. In the present embodiment, the inner surface of the bottom portion 11*a* of the case body 11 corresponds to the first inner surface of the present invention, and the inner surfaces of the side plate portions 11*b* and the end plate portions 11*c* of the case body 11 correspond to the second inner surface of the present invention.

Holes (not numbered) through which the electrode terminals 31 and 32 are passed are formed in the cover plate 12. The electrode terminals 31 and 32 are passed through the holes of the cover plate 12 and fixed on the cover plate 12 like rivets. As a result, outer end portions of the electrode terminals 31 and 32 project from the cover plate 12, and inner end portions of the electrode terminals 31 and 32 project into the interior of the cell case 10.

The power generating element 20 has a positive electrode plate 21 in band form, a negative electrode plate 22 in band form, and a separator 23 in band form interposed between the positive and negative electrode plates 21 and 22, and these plates and the separator are wound into a flat shape. The positive electrode plate 21 projects from the separator 23 to be exposed at one end of the power generating element 20. The negative electrode plate 22 projects from the separator 23 to be exposed at the other end of the power generating element 20. The power generating element 20 is housed in the cell case 10 such that its axis is parallel to the bottom portion 11*a* of the cell case 10, that is, the exposed end portions of the positive electrode plate 21 and the negative electrode plate 22 respectively face the end plate portions 11*c* of the cell case 10.

The current collectors 40 include a positive current collector 40 and a negative current collector 40. The positive current collector 40 connects the power generating element 20 (the positive electrode plate 21 exposed from one end portion of the power generating element 20, i.e., the end portion of the positive electrode plate 21) and the positive electrode terminal 31. The negative current collector 40 connects the power generating element 20 (the negative electrode plate 22 exposed from the other end portion of the power generating element 20, i.e., the end portion of the negative electrode plate 22) and the negative electrode terminal 32. As shown in FIGS. 2 and 3, each current collector 40 has an internal connection portion 41 to which the positive electrode terminal 31 or the negative electrode terminal 32 is connected by being caulked like a rivet or by being welded, an electrode attachment portion 42 connected to an end portion of the positive electrode plate 21 or the negative electrode plate 22 of the power generating element 20, and an intermediate portion 43 that connects the internal connection portion 41 and the electrode attachment portion 42. The current collector 40 is formed from one plate made of a metallic material into a deformed L-shape in the front view.

The positive-electrode current collector 40 is formed of aluminum or an aluminum alloy, for example. The negative-electrode current collector 40 is formed of copper or a copper alloy, for example. However, if importance is attached to the convenience for assembly of the cell, the positive-electrode and negative-electrode current collectors 40 may be made of the same metallic material.

In each current collector 40, the internal connection portion 41 and the electrode attachment portion 42 are oriented in orthogonal directions to each other (in an L-shape in the front view) by folding the intermediate portion 43. The internal connection portion 41 is disposed so as to extend along the rear surface of the cover plate 12 of the cell case 10 in a state of being insulated from the rear surface of the cover plate 12 of the cell case 10. As shown in FIG. 2(*c*), a through hole 41*a* in which an inner end portion of the positive electrode terminal 31 or the negative electrode terminal 32 is to be fitted is provided in a distal end portion of the internal connection portion 41.

The electrode attachment portion 42 is disposed between the end portion of the power generating element 20 and the end plate portion 11*c* of the case body 11. A distal end edge 42*a* of the electrode attachment portion 42 is supported on the bottom portion 11*a* of the case body 11. More specifically, as shown in FIGS. 1 and 3(*a*), a distal end portion 42*b* of the electrode attachment portion 42 is covered with an insulating member (spacer) 50 in the form of a cap, for example. The electrode attachment portion 42 (the distal end edge 42*a* of the electrode attachment portion 42) is thereby supported on the bottom portion 11*a* of the case body 11 while insulation from the case body 11 is secured.

Alternatively, the electrode attachment portion 42 (the distal end edge 42*a* of the electrode attachment portion 42) is supported on the bottom portion 11*a* of the case body 11 via an insulating spacer or an insulating coat disposed between the distal end edge 42*a* and the bottom portion 11*a* of the case body 11, which spacer or coat is not illustrated. The arrangement may alternatively be such that a gap, not illustrated, is provided between the distal end edge 42*a* and the bottom portion 11*a* of the case body 11; an insulating spacer is disposed in this gap; and the electrode attachment portion 42 (the distal end edge 42*a* of the electrode attachment portion 42) is supported on the bottom portion 11*a* of the case body 11 via the spacer.

Figure 2B:
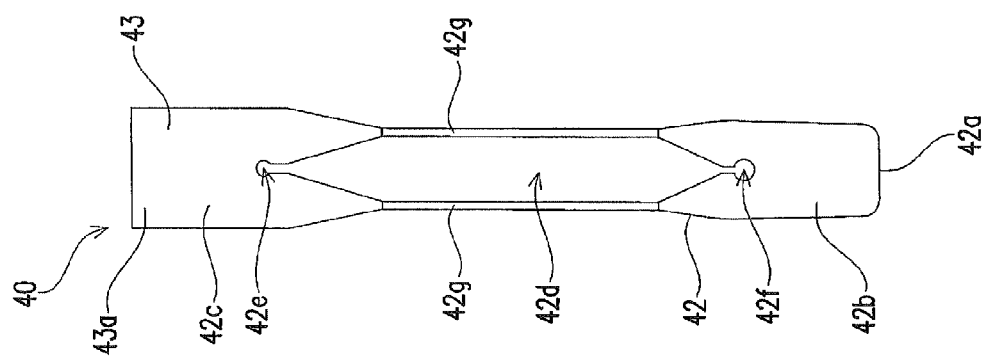

As shown in FIGS. 2(*b*) and 2(*c*), the electrode attachment portion 42 has an opening 42*d* between the distal end portion 42*b* and a proximal end portion 42*c* that is connected to the intermediate portion 43. An inverted V-shaped cut and a V-shaped cut, as seen in the figures, are provided at opposite ends of the opening 42*d*.

C-shaped stop holes 42*e* and 42*f* (a downward-facing C-shape and an upward-facing C-shape in the figure) are provided at opposite ends of the opening 42*d* (at the upper and lower ends in the figure) that are cut into the inverted V-shape and V-shape. The stop hole 42*e* on the proximal end portion 42*c* side (hereinafter referred to as "upper stop hole") is formed smaller than the stop hole 42*f* on the distal end portion 42*b* side (hereinafter referred to as "lower stop hole"). In this way, the strength of a portion around the upper stop hole 42*e* is increased relative to the strength of a portion around the lower stop hole 42*f*.

Along opposite edges of the opening 42*d*, two projections 42*g* projecting in the same direction as the direction in which the internal connection portion 41 extends are provided. The opening 42*d* and the projections 42*g* are formed, for example, by forming a longitudinal cut in a band plate before forming of the electrode attachment portion 42 and by raising portions on opposite sides of this cut. Before raising the portions on the opposite sides of this cut, the C-shaped upper and lower stop holes 42*e* and 42*f* are formed, thereby avoiding splitting the band plate.

The raised projections 42*g* are located inwardly of the opposite side edges of the electrode attachment portion 42. Therefore, upper and lower opposite end portions of the electrode attachment portion 42 are deformed into a W-shape and an inverted W-shape in the figure. However, the arrangement may alternatively be such that the raised projections 42g are not inwardly offset; the opposite end portions of the electrode attachment portion 42 are formed into an inverted M-shape and an M-shape.

Opposite end portions of the projections 42g are twisted by the inverted V-shaped cut and the V-shaped cut in the opening 42d. The opening angle of the inverted V-shaped cut on the proximal end portion 42c side is set smaller than the opening angle of the V-shaped cut on the distal end portion 42b side. Also, the degree of twist of the projections 42g on the proximal end portion 42c side is set smaller than the degree of twist of the projections 42g on the distal end portion 42b side. In this way, the strength of the electrode attachment portion 42 on the proximal end portion 42c side is increased relative to the strength on the distal end portion 42b side.

Figure 2A:
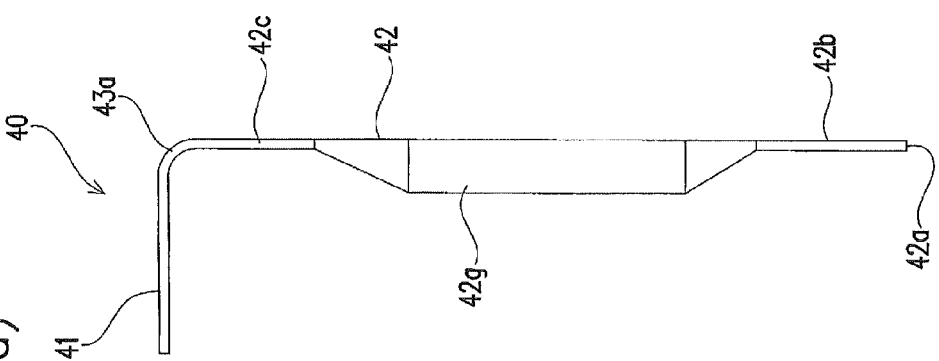
Figure 3:
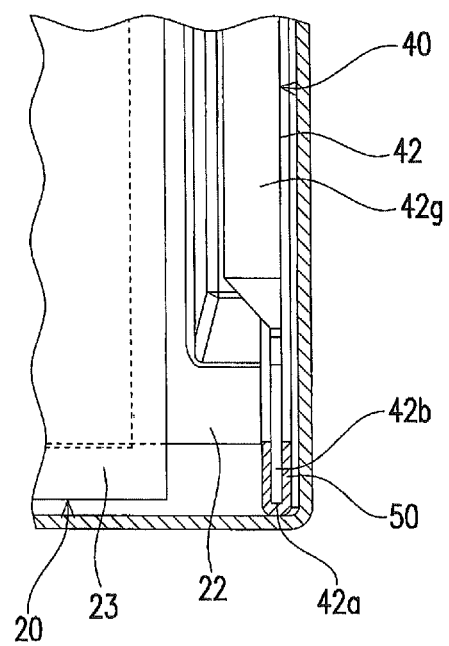
FIG. 3 is a partially sectional enlarged front view of the cell.

The intermediate portion 43 has spring properties so as to be capable of absorbing vibration. The spring properties are imparted by providing a circular-arc portion 43a, as shown in FIG. 2(a).

In the cell according to the first embodiment, the power generating element 20 is in a state of being fixed in the cell case 10 by the current collectors 40 instead of being suspended in the cell case 10 by the current collectors 40. Also, the intermediate portion 43 of each current collector 40 has spring properties. Therefore, even when vibration is applied to the cell, the power generating element 20 does not vibrate with an amplitude and a frequency different from those of the vibration of the cell case 10, or the power generating element 20 vibrates with an amplitude and a frequency in such ranges that the influence of the vibration is not serious. Therefore, when vibration is applied to the cell, no stress is caused in portions of the current collectors 40 (the electrode attachment portions 42) including the portions connected to the power generating element 20 and the bent portions (intermediate portions 43), and breakage is not caused in these portions.

More specifically, a repetitive test based on the vibration test profile in accordance with the UN Transport Test was performed by successively increasing the parameter that defines the maximum acceleration to 8, 10, 12, 15, 18, 20, and 22 G, with the result that no breakage of the current collectors 40 occurred in the cell according to the first embodiment shown in FIG. 1.

Even if the current collectors 40 break, the strength of the electrode attachment portion 42 on the proximal end portion 42c side is increased relative to the strength of the electrode attachment portion 42 on the distal end portion 42b side by setting the degree of twist of the projections 42g on the proximal end portion 42c side smaller than the degree of twist of the projections 42g on the distal end portion 42b side, and/or by making the upper stop hole 42e smaller than the lower stop hole 42f, and/or by setting the width of the electrode attachment portion 42 on the proximal end portion 42c side larger than the width of the electrode attachment portion 42 on the distal end portion 42b side, so that the electrode attachment portion 42 on the distal end portion 42b side first breaks. Thus, in each current collector 40, the electrode attachment portion 42 on the distal end portion 42b side first breaks and the electrode attachment portion 42 on the proximal end portion 42c side does not break. Therefore, use of the cell can be thereafter continued for a while.

Thus, the cell according to the first embodiment can be suitably used by being mounted in vehicles such as a motor vehicle or electric train powered by a fuel cell.

<Second Embodiment>

Figure 5C:
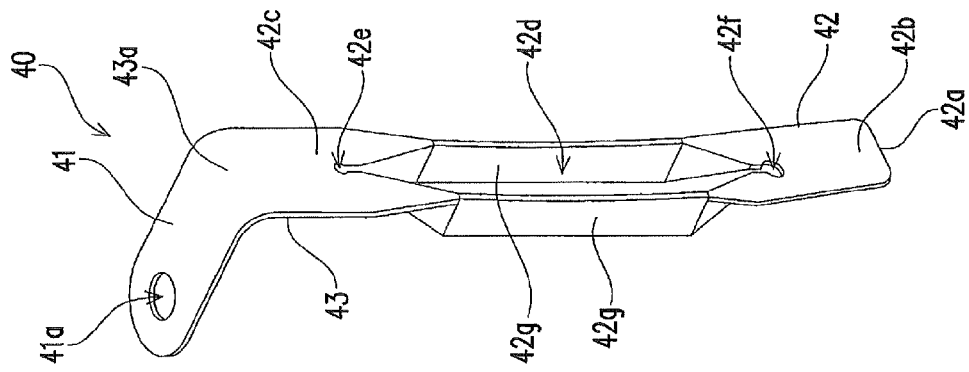
FIGS. 5(a), 5(b), and 5(c) show the current collector.

A second embodiment of the cell according to the present embodiment will be described in detail with reference to FIGS. 4 to 6. For the cell case 10, the power generating element 20, and the electrode terminals 31 and 32, the descriptions in the first embodiment are cited.

The current collectors 40 include the positive current collector 40 and the negative current collector 40. The positive current collector 40 connects the power generating element 20 (the positive electrode plate 21 exposed from one end portion of the power generating element 20, i.e., the end portion of the positive electrode plate 21) and the positive electrode terminal 31. The negative current collector 40 connects the power generating element 20 (the negative electrode plate 22 exposed from the other end portion of the power generating element 20, i.e., the end portion of the negative electrode plate 22) and the negative electrode terminal 32. As shown in FIGS. 5 and 6, each current collector 40 has the internal connection portion 41 to which the positive electrode terminal 31 or the negative electrode terminal 32 is connected by being caulked like a rivet or by being welded, the electrode attachment portion 42 connected to an end portion of the positive electrode plate 21 or the negative electrode plate 22 of the power generating element 20, and the intermediate portion 43 that connects the internal connection portion 41 and the electrode attachment portion 42. The current collector 40 is formed from one plate made of a metallic material into a deformed L-shape in the front view.

The positive-electrode current collector 40 is formed of aluminum or an aluminum alloy, for example. The negative-electrode current collector 40 is formed of copper or a copper alloy, for example. However, if importance is attached to the convenience for assembly of the cell, the positive-electrode and negative-electrode current collectors 40 may be made of the same metallic material.

In each current collector 40, the internal connection portion 41 and the electrode attachment portion 42 are oriented in orthogonal directions to each other (in an L-shape in the front view) by folding the intermediate portion 43. The internal connection portion 41 is disposed so as to extend along the rear surface of the cover plate 12 of the cell case 10 in a state of being insulated from the rear surface of the cover plate 12 of the cell case 10. As shown in FIG. 5(c), a through hole 41a in which an inner end portion of the positive electrode terminal 31 or the negative electrode terminal 32 is to be fitted is provided in a distal end portion of the internal connection portion 41.

The electrode attachment portion 42 is disposed between the end portion of the power generating element 20 and the end plate portion 11c of the case body 11. As shown in FIG. 6, a distal end portion 42b of the electrode attachment portion 42 is bent outwardly in a direction opposite to the internal connection portion 41, i.e., obliquely toward the end plate portion 11c of the cell case 10. The distal end edge 42a of the electrode attachment portion 42 is thereby supported on the bottom portion 11a of the case body 11. In this way, the distal end edge 42a of the electrode attachment portion 42 is also brought into contact with the end plate portion 11b of the case body 11 (via an insulating member 50 described below) to function like a stay. Therefore, the current collector 40 does not become unstable; the power generating element 20 can be supported in a stable state.

The distal end portion 42b of the electrode attachment portion 42 is covered with the insulating member (spacer) 50 in the form of a cap. The electrode attachment portion 42 (the distal end edge 42a of the electrode attachment portion 42) is thereby supported on the bottom portion 11a of the case body 11 while insulation from the case body 11 is secured.

Alternatively, the electrode attachment portion 42 (the distal end edge 42a of the electrode attachment portion 42) is supported on the bottom portion 11a of the case body 11 via an insulating spacer or an insulating coat disposed between the distal end edge 42a and the bottom portion 11a of the case body 11, which spacer or coat is not illustrated. The arrangement may alternatively be such that a gap, not illustrated, is provided between the distal end edge 42a and the bottom portion 11a of the case body 11; an insulating spacer is disposed in this gap; and the electrode attachment portion 42 (the distal end edge 42a of the electrode attachment portion 42) is supported on the bottom portion 11a of the case body 11 via the spacer.

Figure 5B:
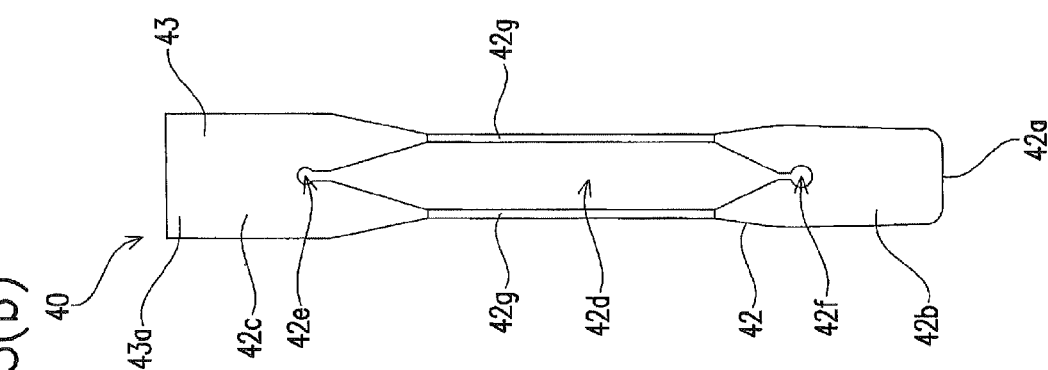
Figure 6:
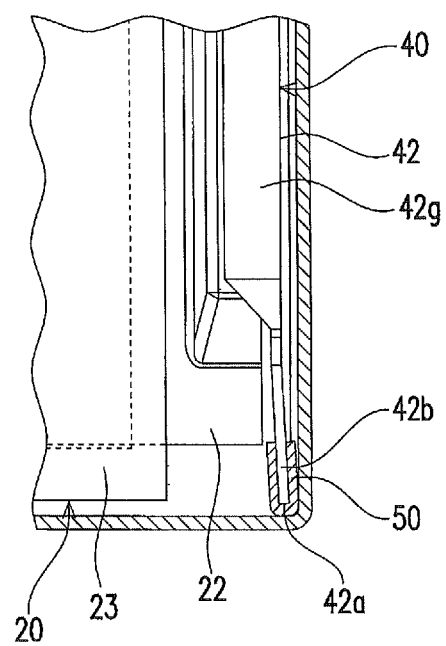
FIG. 6 is a partially sectional enlarged front view of the cell.

As shown in FIGS. 5(b) and 5(c), the electrode attachment portion 42 has the opening 42d between the distal end portion 42b and the proximal end portion 42c that is connected to the intermediate portion 43. An inverted V-shaped cut and a V-shaped cut, as seen in the figures, are provided at opposite ends of the opening 42d.

C-shaped stop holes 42e and 42f (a downward-facing C-shape and an upward-facing C-shape in the figure) are provided at opposite ends of the opening 42d (at the upper and lower ends in the figure) that are cut into the inverted V-shape and V-shape. The stop hole 42e on the proximal end portion 42c side (hereinafter referred to as "upper stop hole") is formed smaller than the stop hole 42f on the distal end portion 42b side (hereinafter referred to as "lower stop hole"). In this way, the strength of a portion around the upper stop hole 42e is increased relative to the strength of a portion around the lower stop hole 42f.

Along opposite edges of the opening 42d, two projections 42g projecting in the same direction as the direction in which the internal connection portion 41 extends are provided. The opening 42d and the projections 42g are formed, for example, by forming a longitudinal cut in a band plate before forming of the electrode attachment portion 42 and by raising portions on opposite sides of this cut. Before raising the portions on the opposite sides of this cut, the C-shaped upper and lower stop holes 42e and 42f are formed, thereby avoiding splitting the band plate.

The raised projections 42g are inwardly offset from the opposite side edges of the electrode attachment portion 42. Therefore, upper and lower opposite end portions of the electrode attachment portion 42 are deformed into a W-shape and an inverted W-shape as seen in the figure. However, the arrangement may alternatively be such that the raised projections 42g are not inwardly offset; the opposite end portions of the electrode attachment portion 42 are formed into an inverted M-shape and an M-shape.

Opposite end portions of the projections 42g are twisted by the inverted V-shaped cut and the V-shaped cut in the opening 42d. The opening angle of the inverted V-shaped cut on the proximal end portion 42c side is set smaller than the opening angle of the V-shaped cut on the distal end portion 42b side. Also, the degree of twist of the projections 42g on the proximal end portion 42c side is set smaller than the degree of twist of the projections 42g on the distal end portion 42b side. In this way, the strength of the electrode attachment portion 42 on the proximal end portion 42c side is increased relative to the strength on the distal end portion 42b side.

Figure 5A:
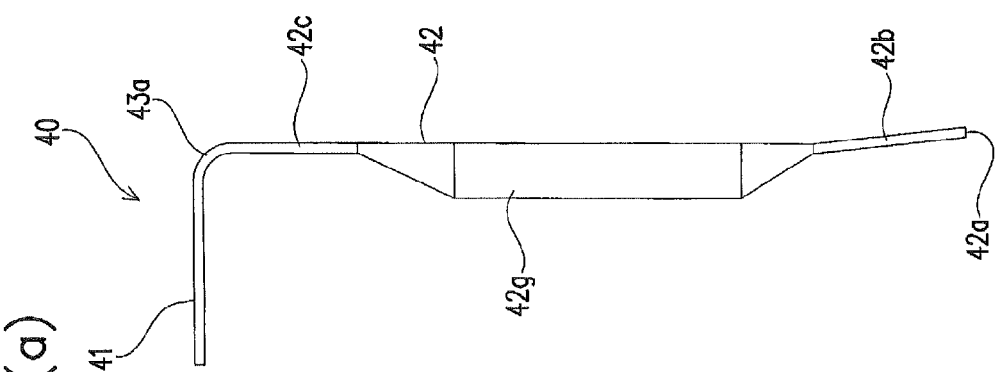

The intermediate portion 43 has spring properties so as to be capable of absorbing vibration. The spring properties are imparted by providing a circular-arc portion 43a, as shown in FIG. 5(a).

In the cell according to the second embodiment, the power generating element 20 is in a state of being fixed in the cell case 10 by the current collectors 40 instead of being suspended in the cell case 10 by the current collectors 40. Also, the intermediate portion 43 of each current collector 40 has spring properties. Therefore, even when vibration is applied to the cell, the power generating element 20 does not vibrate with an amplitude and a frequency different from those of the vibration of the cell case 10, or the power generating element 20 vibrates with an amplitude and a frequency in such ranges that the influence of the vibration is not serious. Therefore, when vibration is applied to the cell, no stress is caused in portions of the current collectors 40 (the electrode attachment portions 42) including the portions connected to the power generating element 20 and the bent portions (intermediate portions 43), and breakage is not caused in these portions.

More specifically, a repetitive test based on the vibration test profile in accordance with the UN Transport Test was performed by successively increasing the parameter that defines the maximum acceleration to 8, 10, 12, 15, 18, 20, and 22 G, with the result that no breakage of the current collectors 40 occurred in the cell according to the second embodiment shown in FIG. 4.

Even if the current collectors 40 break, the strength of the electrode attachment portion 42 on the proximal end portion 42c side is increased relative to the strength of the electrode attachment portion 42 on the distal end portion 42b side by setting the degree of twist of the projections 42g on the proximal end portion 42c side smaller than the degree of twist of the projections 42g on the distal end portion 42b side. Also, by making the upper stop hole 42e smaller than the lower stop hole 42f, and by increasing the strength of the electrode attachment portion 42 on the proximal end portion 42c side relative to the strength of the electrode attachment portion 42 on the distal end portion 42b side, the electrode attachment portion 42 on the distal end portion 42b side first breaks. Thus, in each current collector 40, the electrode attachment portion 42 on the distal end portion 42b side first breaks and the electrode attachment portion 42 on the proximal end portion 42c side does not break. Therefore, use of the cell can be thereafter continued for a while.

Thus, the cell according to the second embodiment can be suitably used by being mounted in vehicles such as a motor vehicle or an electric train powered by a fuel cell.

<Third Embodiment>

Figure 8:
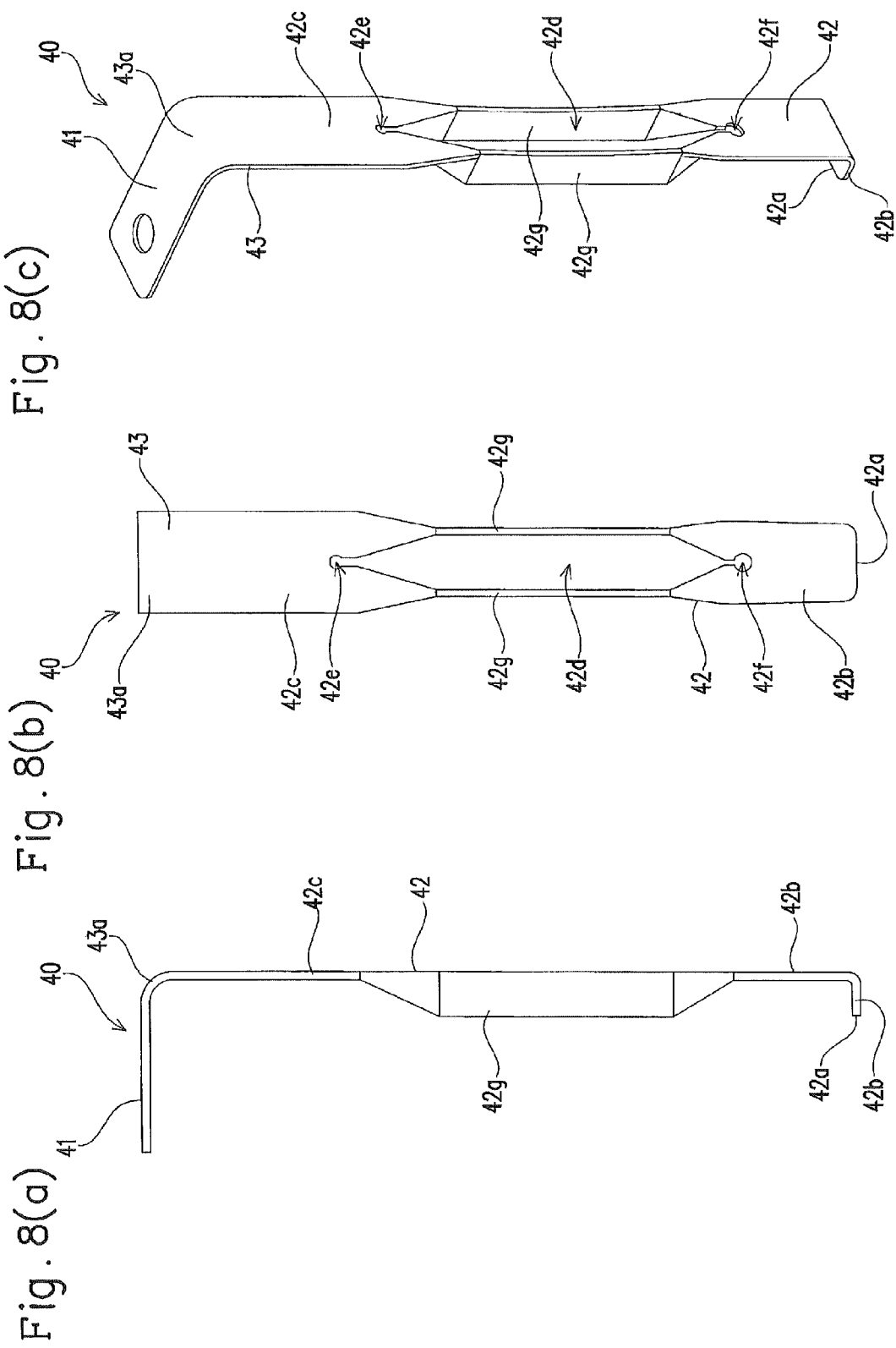
FIGS. 8(a), 8(b), and 8(c) show the current collector.
Figure 9:
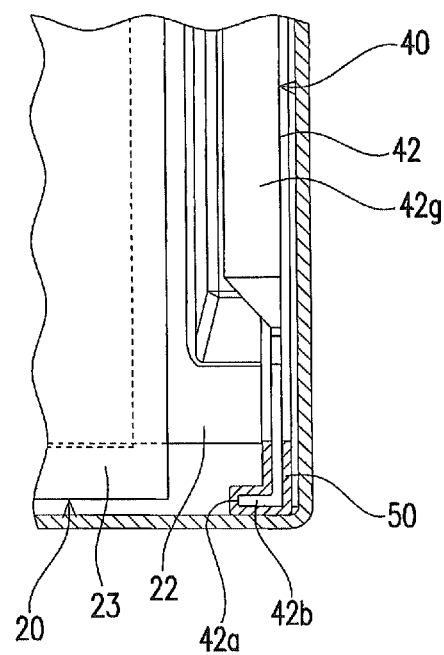
FIG. 9 is a partially sectional enlarged front view of the cell.

A third embodiment of the cell according to the present embodiment will be described in detail with reference to FIGS. 7 to 9. For the cell case 10, the power generating element 20, and the electrode terminals 31 and 32, the descriptions in the first embodiment are cited.

The current collectors 40 include the positive current collector 40 and the negative current collector 40. The positive current collector 40 connects the power generating element 20 (the positive electrode plate 21 exposed from one end portion of the power generating element 20, i.e., the end portion of the positive electrode plate 21) and the positive electrode terminal 31. The negative current collector 40 connects the power generating element 20 (the negative electrode plate 22 exposed from the other end portion of the power generating element 20, i.e., the end portion of the negative electrode plate 22) and the negative electrode terminal 32. As shown in FIGS. 8 and 9, each current collector 40 has the internal connection portion 41 to which the positive electrode terminal 31 or the negative electrode terminal 32 is connected by being caulked like a rivet or by being welded, the electrode attachment portion 42 connected to an end portion of the positive electrode plate 21 or the negative electrode plate 22 of the power generating element 20, and the intermediate portion 43 that connects the internal connection portion 41 and the electrode attachment portion 42. The current collector 40 is formed from one plate made of a metallic material into a deformed L-shape in the front view.

The positive-electrode current collector 40 is formed of aluminum or an aluminum alloy, for example. The negative-electrode current collector 40 is formed of copper or a copper alloy, for example. However, if importance is attached to the convenience for assembly of the cell, the positive-electrode and negative-electrode current collectors 40 may be made of the same metallic material.

In each current collector 40, the internal connection portion 41 and the electrode attachment portion 42 are oriented in orthogonal directions to each other (in an L-shape in the front view) by folding the intermediate portion 43. The internal connection portion 41 is disposed so as to extend along the rear surface of the cover plate 12 of the cell case 10 in a state of being insulated from the rear surface of the cover plate 12 of the cell case 10. As shown in FIG. 8(c), a through hole 41a in which an inner end portion of the positive electrode terminal 31 or the negative electrode terminal 32 is to be fitted is provided in a distal end portion of the internal connection portion 41.

The electrode attachment portion 42 is disposed between the end portion of the power generating element 20 and the end plate portion 11c of the case body 11. As shown in FIG. 9, a distal end portion 42b of the electrode attachment portion 42 is bent so as to extend in the same inward direction as the internal connection portion 41, i.e., in a direction toward the power generating element 20. The distal end edge 42a of the electrode attachment portion 42 is thereby supported by the surface of the bottom portion 11a of the case body 11 (via the insulating member 50 described below). In this way, the distal end edge 42b of the electrode attachment portion 42 functions like a stay contacting the bottom portion 11a of the case body 11 by a large area. Therefore, the current collector 40 does not become unstable; the power generating element 20 can be supported in a stable state.

The distal end portion 42b of the electrode attachment portion 42 is covered with the insulating member (spacer) 50 in the form of a cap. The electrode attachment portion 42 (the distal end edge 42a of the electrode attachment portion 42) is thereby supported on the bottom portion 11a of the case body 11 while insulation from the case body 11 is secured. The distal end edge 42a of the electrode attachment portion 42 is prevented from being stabbed into the insulating member 50 by interposing the insulating member 50 between itself and the bottom portion 11a of the case body 11, so that the insulating member 50 does not break. Also, the distal end portion 42b of the electrode attachment portion 42 may be bent into a circular-arc shape to prevent the bent portion from being stabbed into the insulating member 50 and to prevent breakage of the insulating member 50.

Alternatively, the electrode attachment portion 42 (the distal end edge 42a of the electrode attachment portion 42) is supported on the bottom portion 11a of the case body 11 via an insulating spacer or an insulating coat disposed between the distal end edge 42a and the bottom portion 11a of the case body 11, which spacer or coat is not illustrated. The arrangement may alternatively be such that a gap, not illustrated, is provided between the distal end edge 42a and the bottom portion 11a of the case body 11; an insulating spacer is disposed in this gap; and the electrode attachment portion 42 (the distal end edge 42a of the electrode attachment portion 42) is supported on the bottom portion 11a of the case body 11 via the spacer. The distal end edge 42a or the bent portion of the electrode attachment portion 42 is also prevented from being stabbed into this insulating spacer. Therefore, the insulating spacer does not break.

As shown in FIGS. 8(b) and 8(c), the electrode attachment portion 42 has the opening 42d between the distal end portion 42b and the proximal end portion 42c that is connected to the intermediate portion 43. An inverted V-shaped cut and a V-shaped cut, as seen in the figures, are provided at opposite ends of the opening 42d.

C-shaped stop holes 42e and 42f (a downward-facing C-shape and an upward-facing C-shape in the figure) are provided at opposite ends of the opening 42d (at the upper and lower ends in the figure) that are cut into the inverted V-shape and V-shape. The stop hole 42e on the proximal end portion 42c side (hereinafter referred to as "upper stop hole") is formed smaller than the stop hole 42f on the distal end portion 42b side (hereinafter referred to as "lower stop hole"). In this way, the strength of a portion around the upper stop hole 42e is increased relative to the strength of a portion around the lower stop hole 42f.

Along opposite edges of the opening 42d, two projections 42g projecting in the same direction as the direction in which the internal connection portion 41 extends are provided. The opening 42d and the projections 42g are formed, for example, by forming a longitudinal cut in a band plate before forming of the electrode attachment portion 42 and by raising portions on opposite sides of this cut. Before raising the portions on the opposite sides of this cut, the C-shaped upper and lower stop holes 42e and 42f are formed, thereby avoiding splitting the band plate.

The raised projections 42g are located inwardly of the opposite side edges of the electrode attachment portion 42. Therefore, upper and lower opposite end portions of the electrode attachment portion 42 are deformed into a W-shape and an inverted W-shape in the figure. However, the arrangement may alternatively be such that the raised projections 42g are not inwardly offset; the opposite end portions of the electrode attachment portion 42 are formed into an inverted M-shape and an M-shape.

Opposite end portions of the projections 42g are twisted by the inverted V-shaped cut and the V-shaped cut in the opening 42d. The opening angle of the inverted V-shaped cut on the proximal end portion 42c side is set smaller than the opening angle of the V-shaped cut on the distal end portion 42b side. Also, the degree of twist of the projections 42g on the proximal end portion 42c side is set smaller than the degree of twist of the projections 42g on the distal end portion 42b side. In this way, the strength of the electrode attachment portion 42 on the proximal end portion 42c side is increased relative to the strength on the distal end portion 42b side.

The intermediate portion 43 has spring properties so as to be capable of absorbing vibration. The spring properties are imparted by providing a circular-arc portion 43a, as shown in FIG. 8(a).

In the cell according to the third embodiment, the power generating element 20 is in a state of being fixed in the cell case 10 by the current collectors 40 instead of being suspended in the cell case 10 by the current collectors 40. Also, the intermediate portion 43 of each current collector 40 has spring properties. Therefore, even when vibration is applied to the cell, the power generating element 20 does not vibrate with an amplitude and a frequency different from those of the vibration of the cell case 10, or the power generating element 20 vibrates with an amplitude and a frequency in such ranges that the influence of the vibration is not serious. Therefore, when vibration is applied to the cell, no stress is caused in portions of the current collectors 40 (the electrode attachment portions 42) including the portions connected to the power generating element 20 and the bent portions (intermediate portions 43), and breakage is not caused in these portions.

Figure 7:
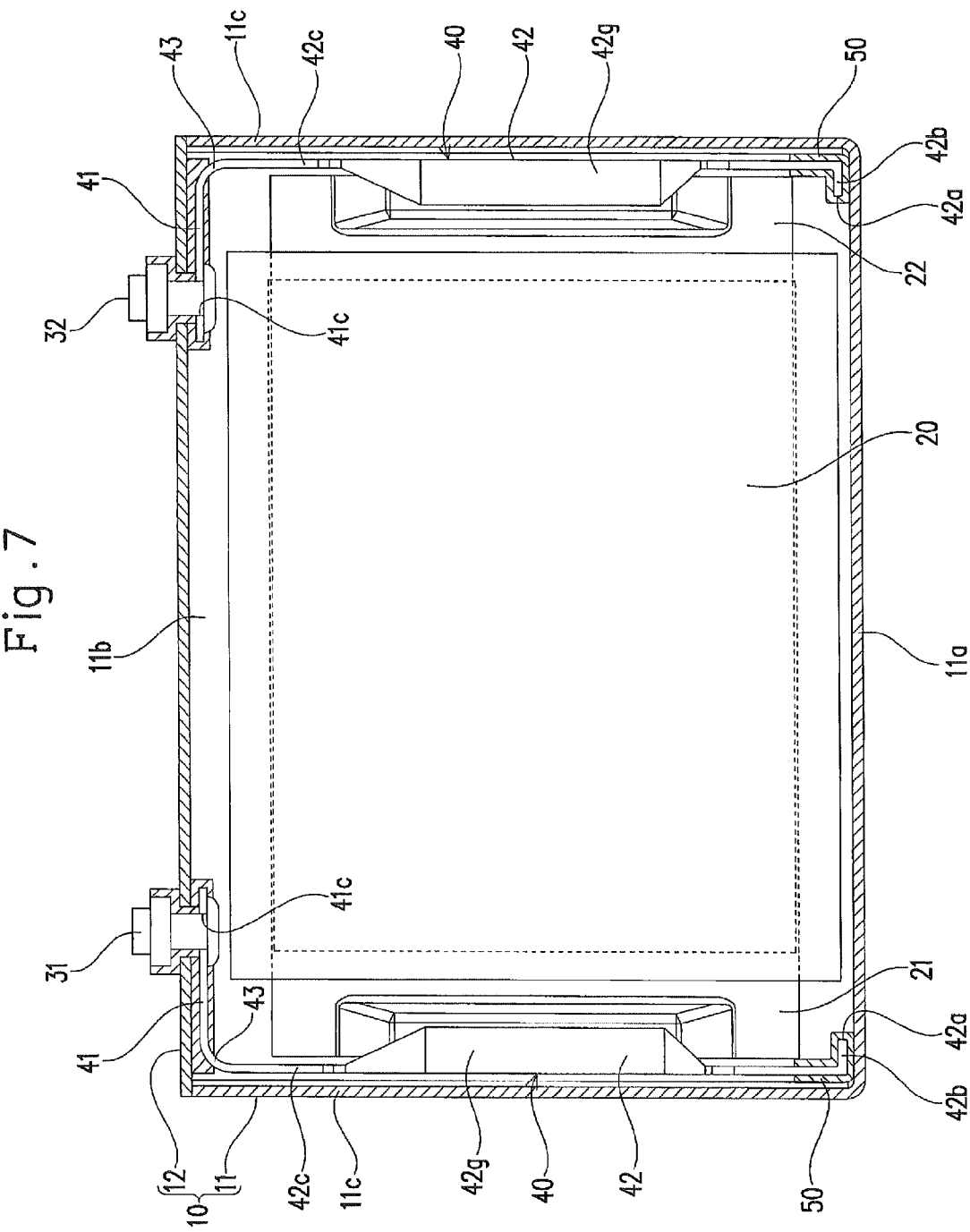
FIG. 7 is a partially sectional front view of a cell having a current collector according to a third embodiment.

More specifically, a repetitive test based on the vibration test profile in accordance with the UN Transport Test was performed by successively increasing the parameter that defines the maximum acceleration to 8, 10, 12, 15, 18, 20, and 22 G, with the result that no breakage of the current collectors 40 occurred in the cell according to the third embodiment shown in FIG. 7.

Even if the current collectors 40 break, the strength of the electrode attachment portion 42 on the proximal end portion 42c side is increased relative to the strength of the electrode attachment portion 42 on the distal end portion 42b side by setting the degree of twist of the projections 42g on the proximal end portion 42c side smaller than the degree of twist of the projections 42g on the distal end portion 42b side. Also, by making the upper stop hole 42e smaller than the lower stop hole 42f, and by increasing the strength of the electrode attachment portion 42 on the proximal end portion 42c side relative to the strength of the electrode attachment portion 42 on the distal end portion 42b side, the electrode attachment portion 42 on the distal end portion 42b side first breaks. Thus, in each current collector 40, the electrode attachment portion 42 on the distal end portion 42b side first breaks and the electrode attachment portion 42 on the proximal end portion 42c side does not break. Therefore, use of the cell can be thereafter continued for a while.

Thus, the cell according to the third embodiment can be suitably used by being mounted in vehicles such as a motor vehicle or an electric train powered by a fuel cell.

The present invention is not limited to the above-described embodiments. Various changes can be made in the described embodiments without departing from the gist of the present invention.

For example, in each current collector 40, the distal end edge 42a of the electrode attachment portion 42 is not necessarily in contact with the end plate portion 11c, as long as it is supported on the bottom portion 11a of the case body 11. Also, the intermediate portion 43 of the electrode attachment portion 42 does not necessarily have spring properties.

Each current collector 40 is not limited to the one orthogonally bent in the intermediate portion 43. The current collector 40 may be bent at an obtuse angle or an acute angle. The current collector 40 may be in such a form as to extend straight from the inner surface of the cover plate 12 toward the bottom portion 11a of the case body 11 without having a bent portion similar to the intermediate portion 43.

In the electrode attachment portion 42, the angle of the inverted V-shape on the proximal end portion 42c side and the angle of the V-shape on the distal end portion 42b side may be equal to each other. In the electrode attachment portion 42, the C-shaped stop holes 42e and 42f may be equal in size to each other. In the electrode attachment portion 42, the width on the proximal end portion 42c side and the width on the distal end portion 42b side may be equal to each other.

Figure 10A:
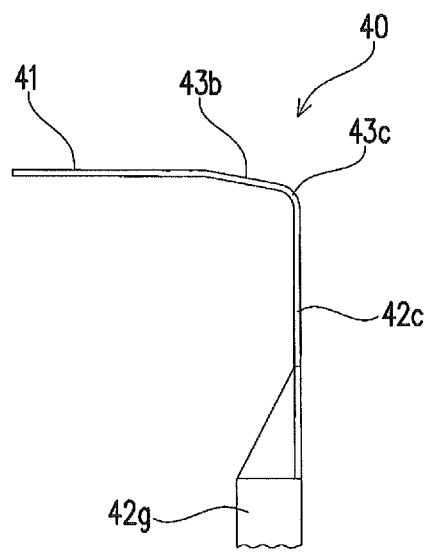
FIGS. 10(a) and 10(b) show a current collector according to another embodiment.

The spring properties of the intermediate portion 43 may be imparted by connecting a slanting portion 43b connected to the internal connection portion 41 and a bent portion 43c provided between the slanting portion 43b and the electrode attachment portion 42, as shown in FIG. 10(a). The spring properties of the intermediate portion 43 may alternatively be imparted by connecting a bent portion 43d connected to the internal connection portion 41 and a laterally-facing U-shaped detour portion 43e provided between the bent portion 43d and the electrode attachment portion 42, as shown in FIG. 10(b).

Figure 10B:
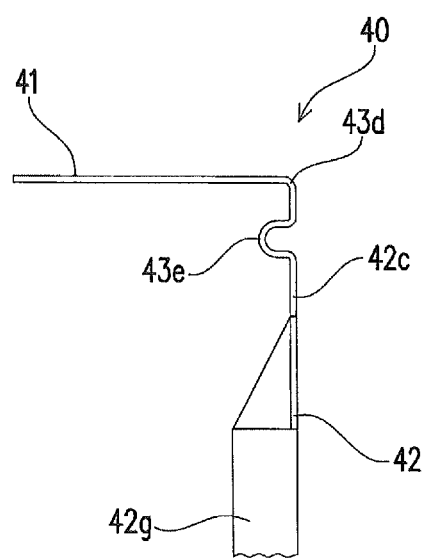
Figure 11:
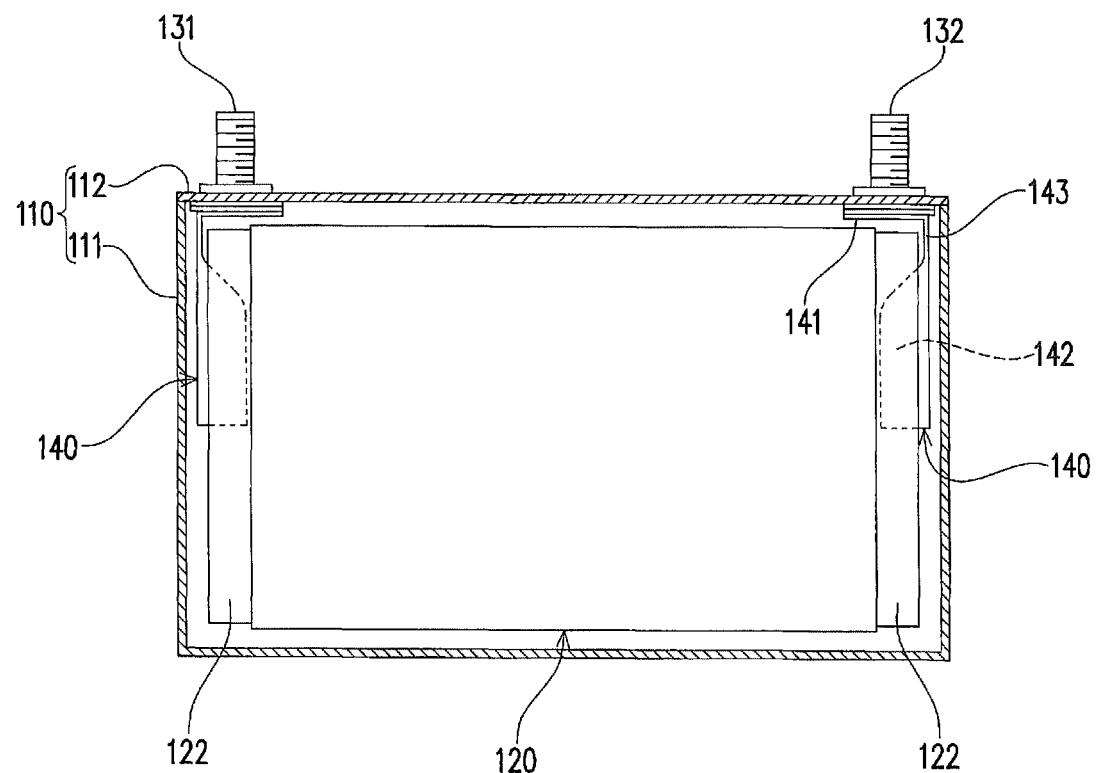
FIG. 11 is a partially sectional front view of a conventional cell.
Figure 12:
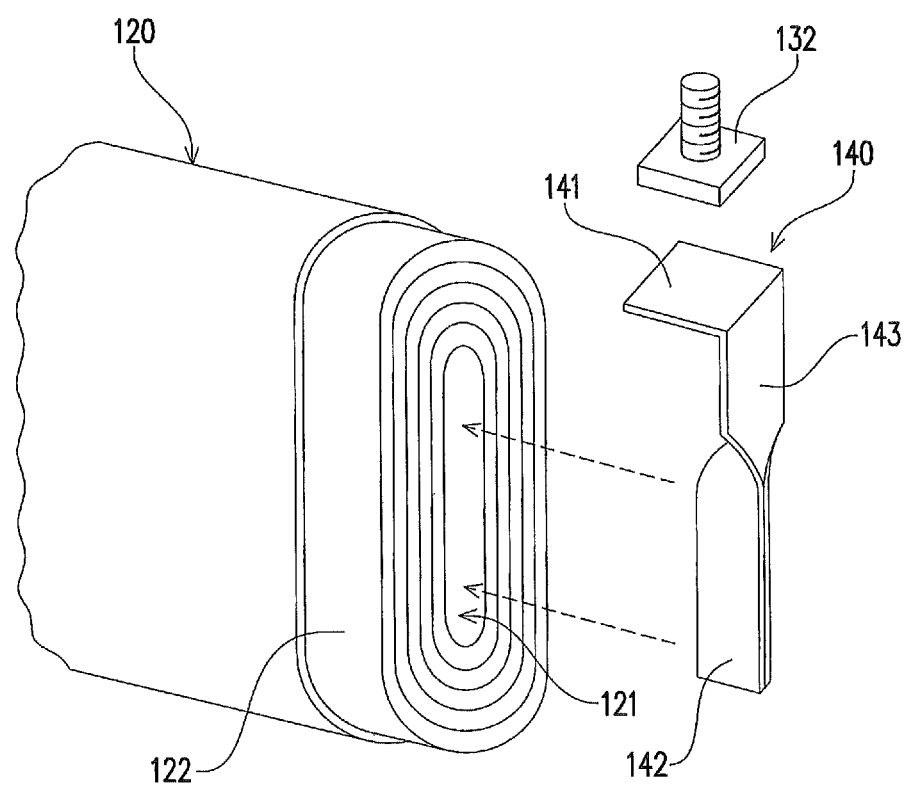
FIG. 12 is an exploded perspective view of an essential portion of the cell.

The detour portion 43e shown in FIG. 10(b) is provided so as to project on the internal connection portion 41 side for a reason relating to the space in the case body 11. However, detour portions 43e in a plurality of places may be provided as well as the one in one place illustrated. A combination of this detour portion 43e and the slanting portion 43b shown in FIG. 10(a) may be provided. Further, the intermediate portion 43 may be provided in wave form by being formed in a meandering fashion to have spring properties.

It is preferable that the end plate portions 11c of the case body 11 be formed so as to be small in width. However, the case body 11 does not necessarily have small-width end portions in some case according to use conditions.

The electric storage device is not limited to battery cells. The electric storage device may be a capacitor such as an electric double layer capacitor.

Needless to say, use of the electric storage device is not limited to use in vehicles.

REFERENCE SIGNS LIST

10 Cell case
11 Case body
11a Bottom portion
11c End plate portion
12 Cover plate
20 Power generating element
31 Electrode terminal
32 Electrode terminal
40 Current collector
41 Internal connection portion
42 Electrode attachment portion
42a Distal end edge
42b Distal end portion
42c Proximal end portion
42d Opening
42e Stop hole
42f Stop hole
42g Projection
43 Intermediate portion

The invention claimed is:

1. An electric storage device, comprising:
a case including a first inner surface and a second inner surface adjacent to the first inner surface;
an electrode assembly housed in the case and including a positive electrode plate and a negative electrode plate insulated from each other;
an electrode terminal disposed outside the case; and
a current collector housed in the case and electrically connecting the electrode assembly and the electrode terminal to each other,
wherein a distal end edge of a distal end portion of the current collector is supported on the first inner surface of the case, and
wherein, in a front view of the electric storage device showing that the electrode terminal protrudes from the case, the distal end portion of the current collector is bent so as to extend along the first inner surface of the case, wherein the case further includes a third inner surface extending parallel to the first inner surface, the electrode terminal protruding from the third inner surface in a direction perpendicular to a direction that a bent portion of the distal end portion of the current collector extends along the first inner surface of the case.

2. The electric storage device according to claim 1, wherein the distal end portion of the current collector is bent so as to be brought into contact with the second inner surface of the case.

3. The electric storage device according to claim 1, wherein the distal end edge of the distal end portion of the current collector is supported on the first inner surface of the case by a physical contact with the first inner surface of the case.

4. The electric storage device according to claim 1, wherein a gap is provided between the distal end edge of the distal end portion of the current collector and the first inner surface of the case, wherein the current collector includes a spacer in the gap, and wherein the distal end edge of the distal end portion of the current collector is supported on the first inner surface of the case via the spacer.

5. The electric storage device according to claim 4, wherein the spacer has an insulating property.

6. The electric storage device according to claim 1, wherein the current collector includes an electrode attachment portion disposed between an end portion of the electrode assembly and the second inner surface of the case, the electrode attachment portion being electrically connected to the end portion of the electrode assembly, and wherein the distal end edge of the distal end portion of the electrode attachment portion is supported on the first inner surface of the case.

7. The electric storage device according to claim 1, wherein the current collector includes:

an internal connection portion connected to the electrode terminal;

an electrode attachment portion disposed between an end portion of the electrode assembly and the second inner surface of the case, the electrode attachment portion being electrically connected to the end portion of the electrode assembly; and an intermediate portion interposed between the internal connection portion and the electrode attachment portion, wherein the intermediate portion comprises a detour portion.

8. The electric storage device according to claim 6, wherein an opening is provided in the electrode attachment portion along a longitudinal direction of the electrode attachment portion, and wherein the electrode attachment portion includes, along an edge of the opening, a projection connected to the end portion of the electrode assembly.

9. An electric storage device, comprising:

a case including a first inner surface and a second inner surface adjacent to the first inner surface;

an electrode assembly housed in the case and including a positive electrode plate and a negative electrode plate insulated from each other;

an electrode terminal disposed outside the case; and a current collector housed in the case and electrically connecting the electrode assembly and the electrode terminal to each other, wherein a distal end edge of a distal end portion of the current collector is supported on the first inner surface of the case, wherein, in a front view of the electric storage device showing that the electrode terminal protrudes from the case, the distal end portion of the current collector is bent so as to extend along the first inner surface of the case, wherein the current collector includes an electrode attachment portion disposed between an end portion of the electrode assembly and the second inner surface of the case, the electrode attachment portion being electrically connected to the end portion of the electrode assembly, wherein the distal end edge of the distal end portion of the electrode attachment portion is supported on the first inner surface of the case, and wherein a strength of the electrode attachment portion on a proximal end portion side is higher than a strength of the electrode attachment portion on a distal end portion side.

10. An electric storage device, comprising:

a case including a first inner surface and a second inner surface adjacent to the first inner surface;

an electrode assembly housed in the case and including a positive electrode plate and a negative electrode plate insulated from each other;

an electrode terminal disposed outside the case; and a current collector housed in the case and electrically connecting the electrode assembly and the electrode terminal to each other, wherein a distal end edge of a distal end portion of the current collector is supported on the first inner surface of the case, wherein, in a front view of the electric storage device showing that the electrode terminal protrudes from the case, the distal end portion of the current collector is bent so as to extend along the first inner surface of the case, wherein the current collector includes an electrode attachment portion disposed between an end portion of the electrode assembly and the second inner surface of the case, the electrode attachment portion being electrically connected to the end portion of the electrode assembly, wherein the distal end edge of the distal end portion of the electrode attachment portion is supported on the first inner surface of the case, wherein an opening is provided in the electrode attachment portion along a longitudinal direction of the electrode attachment portion, wherein the electrode attachment portion includes, along an edge of the opening, a projection connected to the end portion of the electrode assembly, wherein the electrode attachment portion includes a cut at an end of the opening on a proximal end portion side of the electrode attachment portion, and another cut at an end of the opening on the distal end portion side of the electrode attachment portion, and wherein an opening angle of the cut on the proximal end portion side of the electrode attachment portion is smaller than an opening angle of the cut on the distal end portion side of the electrode attachment portion.

11. The electric storage device according to claim 10, wherein each of the cut and said another cut includes a stop hole in its sharp end portion, and wherein the stop hole in the cut on the proximal end portion side of the electrode attachment portion is smaller than the stop hole in the cut on the distal end portion side of the electrode attachment portion.

12. The electric storage device according to claim 6, wherein a width of the electrode attachment portion on a proximal end portion side is larger than a width of the electrode attachment portion on a distal end portion side.

13. A vehicle comprising the electric storage device according to claim 1.

14. The electric storage device according to claim 2, wherein the distal end edge of the distal end portion of the current collector is supported on the first inner surface of the case by a physical contact with the first inner surface of the case.

15. The electric storage device according to claim 2, wherein a gap is provided between the distal end edge of the distal end portion of the current collector and the first inner surface of the case,
wherein the current collector includes a spacer in the gap; and
wherein the distal end edge of the distal end portion of the current collector is supported on the first inner surface of the case via the spacer.

16. The electric storage device according to claim 2, wherein the current collector includes an electrode attachment portion disposed between an end portion of the electrode assembly and the second inner surface of the case, the electrode attachment portion being electrically connected to the end portion of the electrode assembly, and
wherein the distal end edge of the distal end portion of the electrode attachment portion is supported on the first inner surface of the case.

17. An electric storage device, comprising:
a case including a first inner surface and a second inner surface adjacent to the first inner surface;
an electrode assembly housed in the case and including a positive electrode plate and a negative electrode plate insulated from each other;
an electrode terminal disposed outside the case; and
a current collector housed in the case and electrically connecting the electrode assembly and the electrode terminal to each other,
wherein a distal end edge of a distal end portion of the current collector is supported on the first inner surface of the case,
wherein the current collector includes an electrode attachment portion disposed between an end portion of the electrode assembly and the second inner surface of the case, the electrode attachment portion being electrically connected to the end portion of the electrode assembly,
wherein the distal end edge of the distal end portion of the electrode attachment portion is supported on the first inner surface of the case, and
wherein a width of the electrode attachment portion on a proximal end portion side is larger than a width of the electrode attachment portion on a distal end portion side.

18. The electric storage device according to claim 1, wherein a distal end edge of a proximal end of the current collector extends parallel to the third inner surface of the case to reach to the electrode terminal.

* * * * *